Patented Mar. 10, 1936

2,033,538

UNITED STATES PATENT OFFICE 2,033,538

PROCESS OF PREPARING HYDROXYLATED CARBOXYLIC ACIDS

Anderson W. Ralston and Stewart T. Bauer, Chicago, Ill., assignors to Armour and Company, Chicago, Ill., a corporation of Illinois No Drawing. Application April 11, 1935,
Serial No. 15,913

16 Claims. (Cl. 260—112)

This invention relates to processes of preparing hydroxylated carboxylic acids and it comprises processes wherein an unsaturated carboxylic acid substance is treated with an aqueous solution of an alkali metal hypochlorite in the presence of an agent having the property of decomposing a hypochlorite to liberate free oxygen therefrom, and it further comprises processes wherein an unsaturated carboxylic acid and chlorine are introduced into a solution of an alkali metal hydroxide containing such a hypochlorite-decomposing agent.

The hydroxylated carboxylic acids such as dihydroxystearic acid are substances of increasing technical interest and can be put to numerous uses in the arts. Methods of making them now employed, or hitherto proposed, have not been very satisfactory. The classical method is that of reacting an unsaturated carboxylic acid with potassium permanganate. In other instances, the unsaturated carboxylic acid is converted to its corresponding chlorhydrin and then the chlorine atom thereof is replaced by hydroxyl by treatment with alkalies. More recently, as in U. S. Patents 1,594,608 and 1,626,398, the unsaturated carboxylic acid is added, together with carbon dioxide, to a hypochlorite solution. This yields, as an intermediate product, a chlorhydrin of the acid, and the chlorine thereof is then converted to hydroxyl. In substance, this is a modified chlorhydrin method and the prior art has generally considered that any process, to be satisfactory from a commercial stand-point, must include the formation of a chlorhydrin. Methods of utilizing the direct addition of oxygen to the bonds of unsaturation in the acid have almost uniformly been considered impractical. For one thing, the "oxidizing" reaction has been difficult to control, yields have been unsatisfactory, by-products and side reactions excessive, and reagent costs have been high. Regardless of these unsuccessful attempts to add oxygen directly to an unsaturated carboxylic acid, it is apparent that such a method, if available, would be of commercial importance and would be preferable to the chlorhydrin method.

We have now discovered processes by which unsaturated carboxylic acids can be converted directly to hydroxylated acids by the action of oxidizing agents which add oxygen or hydroxyl groups directly to the points of unsaturation in the unsaturated, or "olefinic" acid. We are able to do this with entire avoidance of undesirable side reactions, and our reagent cost is low.

In broad aspects, our process is characterized by treating unsaturated carboxylic acids with oxygen, doubtless in nascent state, liberated from a hypochlorite by the action of hypochlorite-decomposing agents. These agents are salts, oxides, and hydroxides of nickel, cobalt, iron and manganese, that is to say the common metals of the iron group, and we believe that in our process these agents act as oxygen carriers. We believe that they first react with the hypochlorite to form metal peroxides and that these peroxides then give up their oxygen to the unsaturated carboxylic acid coincident with the re-formation of the agent per se. And in our process we do not at any time have a very great excess of unsaturated acid or hypochlorite present, although an excess of the latter is not harmful.

In one specific embodiment our process comprises introducing chlorine and unsaturated carboxylic acid into an alkali-metal hydroxide solution containing one or more of the above agents. The reactions occurring are believed to be as follows although we do not wish to be bound by the theories presented.

As the unsaturated carboxylic acid, for example, a fatty acid such as oleic, admixes with the alkali, an alkali metal soap is first formed. Hence the unsaturated fatty acid, in soap form, is readily miscible with the alkali solution. Concurrently with the addition (preferably slow) of fatty acid, we introduce chlorine gas. The chlorine gas reacts with the alkali metal hydroxide as follows:

The hypochlorite-decomposing agent, for example, nickel oxide, NiO, appears to function as an oxygen carrier. Thus, it most probably reacts with the hypochlorite:

to yield a nickel peroxide. The peroxide then gives up oxygen to the unsaturated fatty acid soap, the oxygen adding on to the oleic acid at the double bond thereof to form an epioxide, or olefin oxide group in the oleic acid molecule. This group has the structure

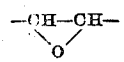

The epioxide immediately hydrates with water to yield the dihydroxy derivative, namely,

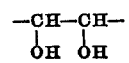

While we believe this is the reaction, it is however possible that hydroxyl groups can add directly to the double bond of the unsaturated acid by interaction of liberated oxygen, water, and unsaturated acid. We therefore are not to be limited by any suggested explanation given.

Formation of the dihydroxy fatty acid is, of course, accompanied by regeneration of nickel oxide, NiO, and further additions of chlorine reconvert the NiO to nickel peroxide so that the cycle continues until the caustic soda is exhausted.

The dihydroxy fatty acid can be recovered from the reaction mixture by acidification thereof with hydrochloric or other suitable inorganic acid, or the soap can be salted out and subsequently treated with hydrochloric.

Thus it will be seen that in our process what we are really doing is liberating oxygen from a hypochlorite and reacting an unsaturated carboxylic acid therewith. Hence, while we are using chlorine and caustic soda, which in prior processes converts the fatty acid to a chlorhydrin, we are so using these reagents that, in the presence of the agent, the fatty acids are directly converted to hydroxy derivatives and not chlorhydrins. In other words, we are using caustic alkali and chlorine to prepare oxygen in particularly active form. And our process is so controlled that at no time do we have any significant excess of unreacted unsaturated fatty acid, and generally no excess of chlorine or hypochlorite. That is to say, the addition of chlorine and fatty acid keep pace with each other so that hypochlorite formed immediately decomposes and its oxygen content is transferred to the fatty acid. While we believe that the actual oxidizing agent is a metal peroxide, such as the $Ni_2O_7$ above, all reactions probably occur substantially simultaneously. An excess of chlorine is not, however, harmful because it is immediately converted to hypochlorite. Since we are operating in an alkaline solution, free hypochlorous acid is not liberated. Hence there is no tendency for the formation of chlorhydrins.

We shall now describe our invention more specifically with reference to the preparation of dihydroxystearic acid, it being understood, however, that the method is equally applicable to the preparation of any hydroxy carboxylic acid containing two or more hydroxyl groups from the corresponding unsaturated carboxylic acid.

We provide a suitable reaction vessel advantageously having a stirrer and means for heating. Into it we introduce an aqueous solution of sodium hydroxide containing a small amount of a nickel salt, oxide, or hydroxide. Satisfactory quantities are about 1000 parts by weight of water, 40 parts by weight of sodium hydroxide, and 5 parts by weight of nickel nitrate.

The caustic soda solution is then cooled to a temperature of about 10°–20° C., the stirrer started and 50 parts by weight of oleic acid slowly added over a period of about five hours. Concurrently, a small stream of chlorine gas is slowly passed into the reaction mixture.

When the addition of oleic acid is completed the temperature of the mixture is allowed to rise and hydrochloric acid is then added until the mixture is slightly acid. The precipitated dihydroxystearic acid is filtered off and is in practically theoretical yield. Occasionally it also contains very small amounts of the epioxide and this can be readily hydrated to the dihydroxy compound.

We find that the reaction goes best at the reduced temperatures stated but we can operate at higher temperatures, as high as 100° C. Hence we do not wish to be limited to the specific temperatures stated.

The nickel compound can be recovered for reuse from the reaction mixture in a simple manner. All that we need do, after filtering off the dihydroxystearic acid, is render the solution alkaline by adding caustic soda. This converts the nickel to insoluble oxide which can be filtered off and added to further quantities of caustic alkali solution to be used in the conversion of more oleic acid. The nickel oxide or salt does not lose its activity over prolonged periods of time.

The rate of oxidation can be nicely controlled by simply regulating the addition of fatty acid, chlorine, and the temperature.

Instead of using nickel compounds as agents we can use salts, oxides, and hydroxides of cobalt, iron and manganese, in other words, compounds of the metals of the iron group. Because the reaction mixture is alkaline, these metal compounds, if added as salts such as nitrates, sulphates, and chlorides, are almost immediately hydrolyzed to oxides or hydroxides. As stated, they function to liberate oxygen from hypochlorites and accordingly we choose to define them in the appended claims as a "hypochlorite-decomposing agent functioning to liberate oxygen from hypochlorites".

The proportions of caustic soda and agent in the example given above are not critical and it is understood that these proportions can be varied over wide limits. The amount of agent can be increased to 15 or 20 parts if desired but no particular advantage is gained. Similarly the strength of the caustic soda can be varied over wide limits. We can, of course, use other alkali metal hydroxides such as potassium hydroxide although caustic soda is much less expensive.

There are various modifications of our process. For example, we can start with an alkali metal salt of an unsaturated carboxylic acid and add an aqueous solution or emulsion thereof to an alkali metal hydroxide solution containing the agent, and into which chlorine is passed. Or we can prepare an aqueous solution of an alkali metal salt of the unsaturated acid, suspend the agent therein, and slowly add the resulting mixture to an alkaline hypochlorite solution. But because hypochlorites are easily prepared from chlorine and caustic soda we find it more advantageous to start with caustic soda, chlorine, unsaturated acid, and agent as described in the foregoing specific example. The alternative methods can be used and the appended claims are intended to embrace them.

As stated, our process is applicable to the conversion of any unsaturated carboxylic acid to its hydroxylated compound. Linolenic acid gives us hexahydroxystearic acid. Linoleic acid yields tetrahydroxystearic acid and ricinoleic acid gives trihydroxystearic acid.

Similarly we can start with mixed unsaturated fatty acids such as those from linseed oil. And we can use the various olefin carboxylic acids such as acrylic, crotonic, nonylenic, hexenic, angelic, and others. If the acid be normally solid, as angelic (melting point 45° C.), we first liquefy it before adding it to the caustic soda solution. Hence the processes of the present invention are applicable to the conversion of olefinic carboxylic acids in general to their corresponding di, tri, and higher hydroxylated derivatives. The extent of hydroxylation is, of course, dependent upon the number of double bonds in the unsaturated carboxylic acid. And we can start with various derivatives or substitution products of the unsaturated carboxylic acids so long as they contain at least one double bond available for the addition of hydroxyl groups thereto, and the derivative or substitution product is miscible with the reaction mixture. Most of the unsaturated carboxylic acids, and their derivatives and substitution products form alkali metal salts or soaps which have the desired miscibility with the reaction mixture. The salts and soaps need not be strictly "soluble" although the alkali metal salts of the lower members of the acids are water soluble. It is sufficient for our purpose if the salt or soap becomes "dispersed" in water. This is the case with the alkali metal soaps. Most of them are not truly soluble in water except at very high dilutions, but they are all "colloidally" soluble in water. This is enough for our purpose and in the appended claims we mean the term "miscible" to cover true solutions, colloidal solutions, and emulsions of the unsaturated carboxylic acid substance.

Having thus described our invention what we claim is:

1. The process of preparing hydroxy fatty acids which includes the step of treating an unsaturated fatty acid compound with an aqueous solution of an alkali metal hypochlorite in the presence of a hypochlorite-decomposing agent functioning to liberate oxygen from said hypochlorite, the fatty acid compound belonging to the group consisting of unsaturated fatty acids and alkali-metal salts thereof.

2. The process as in claim 1 wherein the agent is a metal compound chosen from the group consisting of iron, cobalt, manganese and nickel compounds.

3. The process as in claim 1 wherein the agent is nickel oxide.

4. The process of preparing a hydroxy stearic acid containing at least two hydroxyl groups which includes the step of treating an unsaturated fatty acid compound containing eighteen carbon atoms with an aqueous solution of an alkali metal hypochlorite in the presence of a hypochlorite-decomposing agent functioning to liberate oxygen from said hypochlorite, the fatty acid compound belonging to the group consisting of an unsaturated fatty acid containing eighteen carbon atoms and alkali-metal salts thereof.

5. The process as in claim 4 wherein the agent is a metal compound chosen from the group consisting of iron, cobalt, manganese and nickel compounds.

6. The process as in claim 4 wherein the agent is nickel oxide.

7. The process of preparing dihydroxystearic acid which includes the step of treating an oleic acid compound with an aqueous solution of an alkali metal hypochlorite in the presence of a hypochlorite-decomposing agent functioning to liberate oxygen from said hypochlorite, the oleic acid compound belonging to the group consisting of oleic acid and alkali-metal salts thereof.

8. The process as in claim 7 wherein the agent is a metal compound chosen from the group consisting of iron, cobalt, manganese and nickel compounds.

9. The process as in claim 7 wherein the agent is nickel oxide.

10. The process of preparing hydroxy carboxylic acids of the fatty acid series which includes the step of introducing chlorine and an unsaturated fatty acid into an aqueous solution of an alkali metal hydroxide containing a hypochlorite-decomposing agent functioning to liberate oxygen from hypochlorite formed in said solution.

11. The process as in claim 10 wherein the agent is a metal compound chosen from the group consisting of iron, cobalt, manganese and nickel compounds.

12. The process as in claim 10 wherein the agent is nickel oxide.

13. The process of preparing a hydroxy stearic acid containing at least two hydroxyl groups which includes the step of introducing chlorine and an unsaturated fatty acid containing eighteen carbon atoms into an aqueous solution of an alkali metal hydroxide containing a hypochlorite-decomposing agent functioning to liberate oxygen from hypochlorite formed in said solution.

14. The process as in claim 13 wherein the unsaturated fatty acid is oleic.

15. The process as in claim 13 wherein the agent is a nickel compound.

16. The process as in claim 13 wherein the unsaturated fatty acid is oleic and the agent is nickel oxide.

ANDERSON W. RALSTON.
STEWART T. BAUER.